Patented Aug. 18, 1942

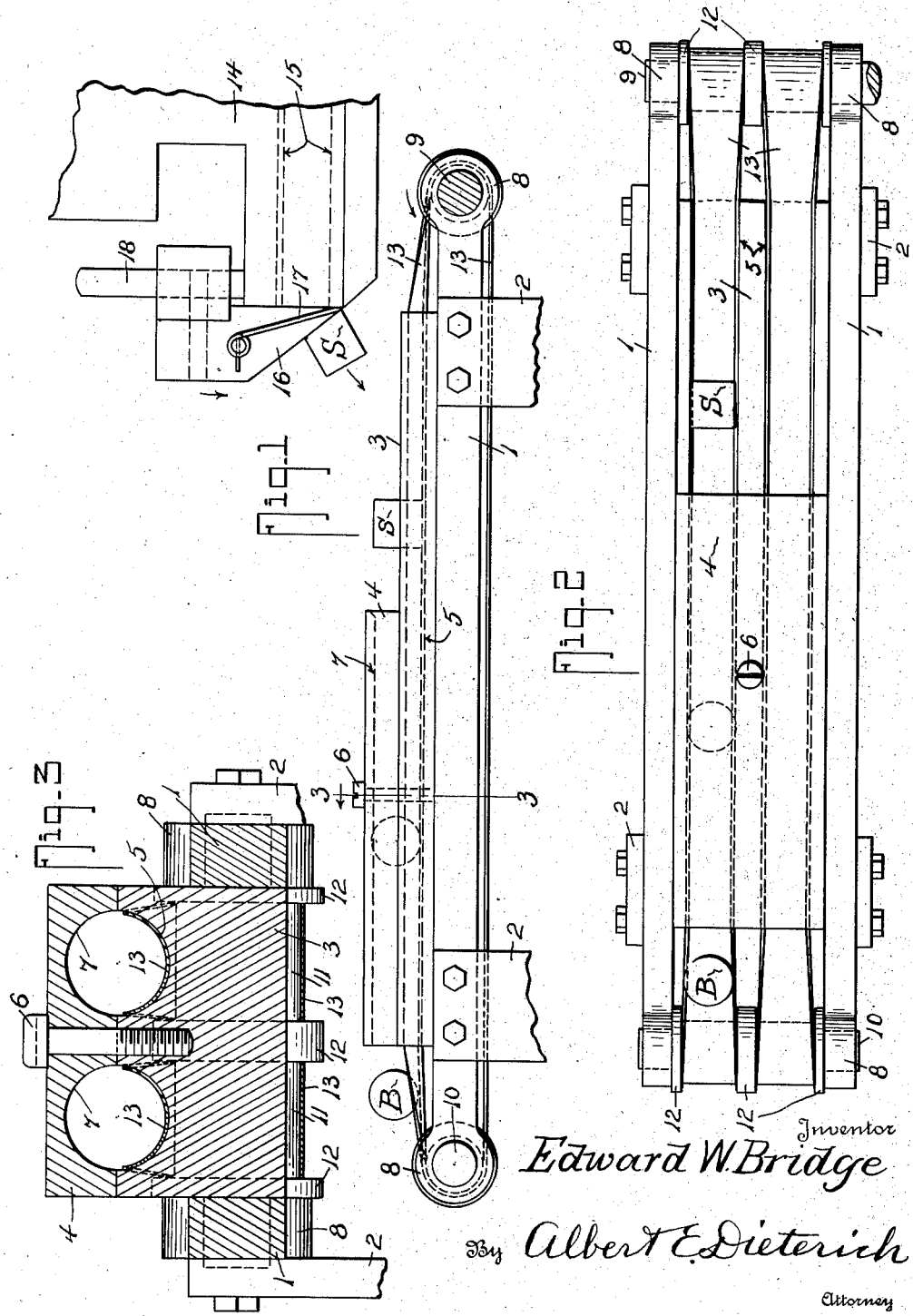

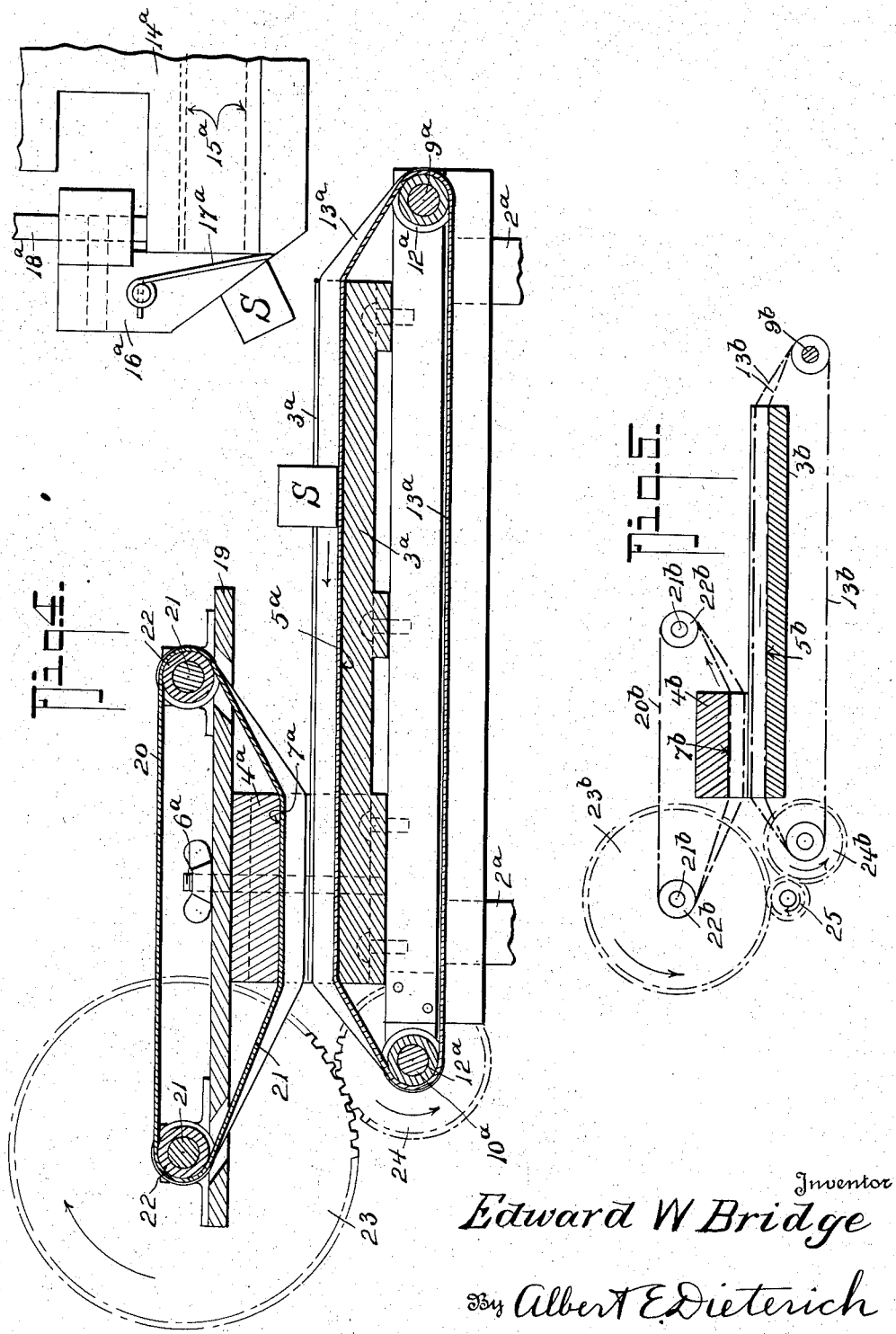

2,293,109

UNITED STATES PATENT OFFICE 2,293,109

MASS BALLING MACHINE

Edward W. Bridge, Philadelphia, Pa.

Application November 18, 1940, Serial No. 366,168

2 Claims. (Cl. 107—9)

My invention relates to machines for forming plastics into balls, and it especially has for its object to provide a machine for taking plastic slugs from a die-expressing machine and rolling the slugs (of any shape) into globular masses or balls.

A further object is to provide a mass balling machine that is particularly adapted for use with the candy depositing machine for which application for patent was filed October 23, 1939, Serial No. 300,864.

Generally, the present invention includes one or more endless flexible belts running through a tunnel of circular cross-section, the belts carrying the slugs into and through the tunnel and rolling them into balls before discharging the masses from the machine.

More specifically, the invention resides in providing a long mold board and a short mold board removably secured together to form the tunnel and a trough in advance of the tunnel into which and along which one flight of an endless belt passes, the belt running flat over flat end pulleys and curving where it runs along the longer mold board to conform to the cross-sectional curvature of the trough tunnel.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 1 is a side elevation of the invention, a portion of the discharge end of the candy-depositing machine being shown.

Fig. 2 is a top plan view of the invention.

Fig. 3 is an enlarged cross section of the same on the line 3—3 of Fig. 1.

Fig. 4 is a vertical longitudinal section of another embodiment of my invention.

Fig. 5 is a diagrammatic view of a further modification.

In the drawings, in which like numbers of reference indicate like parts in all the figures, 1 represents the side bars which have end bearings 8 for the driving shaft 9 and idle shaft 10 on which shafts pulleys 11 are mounted. These pulleys have flanges 12 between which the endless belts 13 run.

The machine is suitably supported, as at 2.

Mounted between the bars 1 is the longer mold board 3 which has one or more semicircular channels 5. The shorter mold board 4 also has semicircular channels 7 which match those of board 3. The shorter mold board 4 is secured to the longer one by any suitable means, as a bolt 6.

Preferably, the tops of the pulleys 11 are slightly lower than the bottoms of the channels 5 and the widths of the belts are such that the curved flights will occupy not more than the surface of the channels 5.

By providing the longer mold board 3 on the bottom and locating the shorter one 4 adjacent the farther end of the longer one, a space in advance of the tunnel is provided onto which the slugs S from the die-expressing machine 14 are received in spaced relation.

Furthermore, the longer mold board, being considerably longer than the shorter one, serves to keep the belts tracking straight.

The depositing machine has one or more throats 15, through which the material is expressed, and a cutter 16 reciprocating on pins 18 and having a wire 17 to sever the mass into slugs S.

The balls B roll off the far end of the machine onto any suitable receiver (not shown).

In the embodiment of Figure 4, an upper belt 20 is used. This belt passes over pulleys 22 on shafts 21 that are mounted in suitable bearings on a bracket 19. In passing through the tunnel, the belt 20, like the belt 13a assumes the cross-sectional form of the tunnel. In Figure 4, those parts which correspond to like parts in the preceding figures bear the same reference number plus the index letter a and a repetition of their description is thought to be unnecessary here. The belt 20 may be driven by a gear connection 23, 24 with belt 13a.

In the modification indicated in Figure 5, the upper belt 20b is shown as running backwards through the tunnel. This may be accomplished by interposing a reversing pinion 25 between the gears 24b and 23b. Those parts in Figure 5 which correspond to similar parts in Figure 4 bear the same reference number plus the index letter b and a repetition of their description here is thought to be unnecessary.

In the last two embodiments of my invention, the upper belts are shorter than the lower ones. The upper and lower belts preferably travel in the same direction (Fig. 4) as this helps to prevent the slugs from choking the entrance of the tunnel. Its slower motion gives the lower belt, which is travelling at a higher speed, the opportunity to roll the mass into a ball.

In practice, I have operated the machine in three ways: First, I have operated it with the upper belt running through the tunnel in the same direction as the lower belt (Fig. 4). Secondly, I have operated it with the top belt running backwardly through the tunnel (Fig. 5); and thirdly, I have operated it with the top belt standing still; (which can be accomplished by disconnecting pinions 25) this gives a rough surface to the top of the tunnel groove for rolling.

Each of the aforesaid three ways of operating the machine will roll a mass into a ball; but the one used in operating the machine depends largely upon the mixture of the mass to be rolled. This is due to either increased fondant and egg albumen or in the other case an extreme quantity of coconut oil.

From the foregoing description, taken into consideration with the accompanying drawings, it is thought that the advantages, operation and construction of the invention will be clear to those skilled in the art.

What I claim is:

1. A mass balling machine comprising a support; a lower mold board having at least one longitudinal groove of arcuate cross-section; an endless belt the upper flight of which lies in part in said groove; pulleys adjacent the ends of said lower mold board around which said belt passes, one of said pulleys being a belt-driving pulley; and an upper mold board cooperating with said lower mold board having a longitudinal groove to constitute, with at least a portion of said lower mold board, a tunnel through which slugs are carried by said belt, said lower mold board being longer than said upper mold board to extend in advance of the same and constitute a trough to receive slugs deposited into the trough.

2. A mass balling machine comprising a support; a lower mold board having at least one longitudinal groove of arcuate cross-section; an endless belt the upper flight of which lies in part in said groove; pulleys adjacent the ends of said lower mold board around which said belt passes, one of said pulleys being a belt-driving pulley; an upper mold board cooperating with said lower mold board having a longitudinal groove to constitute, with at least a portion of said lower mold board, a tunnel through which slugs are carried by said belt, said lower mold board being longer than said upper mold board to extend in advance of the same and constitute a trough, to receive slugs deposited into the trough; an endless belt the lower flight of which lies in part in the groove of said upper mold board; pulleys for carrying said last-named endless belt; and means for driving said endless belts.

EDWARD W. BRIDGE.